(12) United States Patent
Srinivasan et al.

(10) Patent No.: US 8,868,077 B2
(45) Date of Patent: Oct. 21, 2014

(54) METHOD AND APPARATUS FOR TOPOLOGY MANAGEMENT FOR HANDOVERS IN HETEROGENEOUS NETWORKS

(75) Inventors: Murari Srinivasan, Palo Alto, CA (US); Brett Schein, San Jose, CA (US); Amit Butala, Sunnyvale, CA (US)

(73) Assignee: SpiderCloud Wireless, Inc., San Jose, CA (US)

( * ) Notice: Subject to any disclaimer, the term of this patent is extended or adjusted under 35 U.S.C. 154(b) by 134 days.

(21) Appl. No.: 13/572,006

(22) Filed: Aug. 10, 2012

(65) Prior Publication Data

US 2013/0210436 A1 Aug. 15, 2013

Related U.S. Application Data

(60) Provisional application No. 61/521,930, filed on Aug. 10, 2011.

(51) Int. Cl.
*H04W 36/00* (2009.01)
*H04W 36/30* (2009.01)
*H04W 36/02* (2009.01)
*H04W 84/04* (2009.01)
*H04W 36/14* (2009.01)

(52) U.S. Cl.
CPC ............ *H04W 36/026* (2013.01); *H04W 36/30* (2013.01); *H04W 84/045* (2013.01); *H04W 36/0072* (2013.01); *H04W 36/14* (2013.01)
USPC ............ 455/436; 455/438; 455/443; 455/444

(58) Field of Classification Search
CPC ...... H04W 36/00; H04W 36/08; H04W 36/14
USPC .................................. 455/436, 438, 443, 444
See application file for complete search history.

(56) References Cited

U.S. PATENT DOCUMENTS

| | | | |
|---|---|---|---|
| 2006/0262800 A1* | 11/2006 | Martinez et al. | 370/395.52 |
| 2007/0289002 A1* | 12/2007 | van der Horst et al. | 726/9 |
| 2008/0132239 A1* | 6/2008 | Khetawat et al. | 455/438 |
| 2010/0203891 A1* | 8/2010 | Nagaraja et al. | 455/436 |
| 2011/0019638 A1* | 1/2011 | Hamel et al. | 370/331 |
| 2011/0161673 A1* | 6/2011 | Shin et al. | 713/176 |
| 2012/0094666 A1* | 4/2012 | Awoniyi et al. | 455/435.1 |
| 2012/0309394 A1* | 12/2012 | Radulescu et al. | 455/436 |
| 2013/0310034 A1* | 11/2013 | Fan | 455/435.1 |

* cited by examiner

*Primary Examiner* — Barry Taylor
(74) *Attorney, Agent, or Firm* — AlbertDhand LLP

(57) ABSTRACT

A method comprises receiving a relocation required message for a user equipment from a source Radio Access Network (RAN); multicasting a relocation request to multiple local RANs; receiving a first relocation acknowledgement from a first local RAN of the multiple local RANs to which a user equipment may be handed into; and forwarding the first relocation acknowledgement to the source RAN.

22 Claims, 5 Drawing Sheets

METHOD AND APPARATUS FOR TOPOLOGY MANAGEMENT FOR HANDOVERS IN HETEROGENEOUS NETWORKS

RELATED APPLICATIONS

This application claims priority under 35 U.S.C. §119(e) to U.S. Provisional Patent Application No. 61/521,930, titled METHOD AND APPARATUS FOR TOPOLOGY MANAGEMENT FOR HANDOVERS IN HETEROGENEOUS NETWORKS, filed Aug. 10, 2011, incorporated herein by reference in its entirety for all purposes.

TECHNICAL FIELD

The present invention relates to communication networks, and more particularly, to procedures for achieving seamless hand-in from a macrocellular network into an underlay local area Radio Access Network (RAN).

BACKGROUND

Cellular networks have traditionally been deployed in a homogenous manner. For example, a typical cellular network may comprise a plurality of macrocells that are fairly uniform in the coverage areas they support. In the case of $3^{rd}$ Generation Partnership Project (3GPP) Universal Mobile Telecommunications System (UMTS) networks, each of these macrocells is connected to a Radio Network Controller (RNC). The RNC generally effectuates radio resource management, as well as some mobility management functionality, such as facilitating handover, maintaining device state, and supporting layer 2 data-plane protocols.

There are some exceptions to the uniform deployment paradigm described above, such as picocell and femtocell networks that are deployed in conjunction with an overarching macrocellular network. That is, picocells and femtocells, which may be considered small cellular base stations or access points, connect to a service provider's macrocellular network via broadband connections, allowing the macrocellular network to be extended either for capacity augmentation or for extending the coverage (e.g., indoors). These picocells and femtocells may be deployed in the same frequency channel as the macrocellular network, in which case they are referred to as co-channel deployments, or in a different frequency channel, in which case they are referred to as dedicated channel deployments.

For example, in-building Distributed Antenna Systems (DASs), powered by picocells, are deployed sporadically within the shadow of the macrocellular network. These picocells are typically manually provisioned to connect to the same RNC that is serving the nearby macrocells, thus facilitating mobility in and out of the coverage area of the picocell. In recent years, there has been a rapid growth of consumer femtocells, which are typically standalone entities serving a limited area. Each of these consumer femtocells is typically connected to a femtocell gateway that interfaces the femtocells with the core network of the cellular service provider. In some cases, the gateway also facilitates "hand-out" of a user "in a call" from the femtocell to the macrocellular network. The gateway may also use a white list of International Mobile Subscriber Identities (IMSIs) provisioned per femtocell along with user equipment (UE) measurements to facilitate "hand-in" of a user into a particular femtocell. However, commercial solutions that do not require a white list of IMSIs for hand in to a femtocell do not appear to exist.

SUMMARY

Various aspects of examples of the invention are set out in the claims.

According to a first aspect of the present invention, a method comprises receiving a relocation required message for a user equipment from a source Radio Access Network (RAN); multicasting a relocation request to multiple local RANs; receiving a first relocation acknowledgement from a first local RAN of the multiple local RANs to which a user equipment may be handed into; and forwarding the first relocation acknowledgement to the source RAN.

In one embodiment, the relocation required message is received at a local RAN gateway.

In one embodiment, the relocation required message is received from a source Radio Network Controller (RNC) in communication with the user equipment and being based on a measurement report received by the source RNC from the user equipment, the measurement report indicating the presence of a local RAN cell identified by a primary scrambling code.

In one embodiment, the multicasting further comprises multicasting a pre-configured resource allocation. The pre-configured resource allocation may indicate allocation of resources on one or more cells on each of the multiple local RANs for a radio bearer for establishing with the user equipment.

In one embodiment, the multicasting further comprises multicasting first and second tokens to the multiple local RANs along with the relocation request. Based on the first and second tokens, each of the multiple local RANs may allocate resources on one or more cells for a radio bearer for establishing with the user equipment. In a particular embodiment, the method further comprises changing a configuration of the user equipment on the first local RAN after the establishment of the radio resource control connection with the user equipment in order to free at least one of the first and the second tokens for subsequent reuse across the multiple local RANs. In another particular embodiment, the method further comprises freeing at least one of the first and second tokens only after the radio resource control connection on the first local RAN is released by the user equipment. The first token may be an airlink token and the second token may be an identifier token.

In one embodiment, the method further comprises establishing a radio resource control connection with a cell of one or more cells on one of the multiple local RANs; and issuing, from the one of the multiple local RANs, a relocation complete message to the source RAN via a local RAN gateway at which the relocation request is received. The method may further comprise, upon reception of the relocation complete message at the local RAN gateway, issuing instructions to clean up resources on others of the multiple local RANs upon which the radio resource control connection was not established.

In one embodiment, at least one of the multiple local RANs configures one or more cells of the local RAN to facilitate detection by the user equipment. The local RAN may use boundary primary scrambling codes (PSCs) to facilitate detection of the cells.

In a second aspect of the present invention, an apparatus comprises a processor; and a memory including computer program code. The memory and the computer program code are configured to, with the processor, cause the apparatus to perform at least the following: receiving a relocation required message for a user equipment from a source Radio Access Network (RAN); multicasting a relocation request to multiple local RANs; receiving a first relocation acknowledgement from a first local RAN of the multiple local RANs to which a user equipment may be handed into; and forwarding the first relocation acknowledgement to the source RAN.

In a third aspect of the present invention, a computer program product, embodied on a non-transitory computer-readable medium, comprises: computer code for receiving a relocation request for a user equipment; computer code for multicasting the relocation request to multiple local Radio Access Networks (RANs); computer code for receiving a first relocation acknowledgement from a first local RAN of the multiple local RANs to which a user equipment may be handed into; and computer code for forwarding the first relocation acknowledgement to a core network.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF CERTAIN EMBODIMENTS

Certain issues arise during handovers in a Wideband Code Division Multiple Access (WCDMA) network. For example, handovers from a macrocell to a femtocell would require disambiguation of a particular Primary Scrambling Code (PSC) reported by a UE from a plurality of available PSCs. Additionally, although partial solutions exist with regard to addressing hand-in issues in the consumer femtocell context, such solutions are not scalable.

Figure 1:
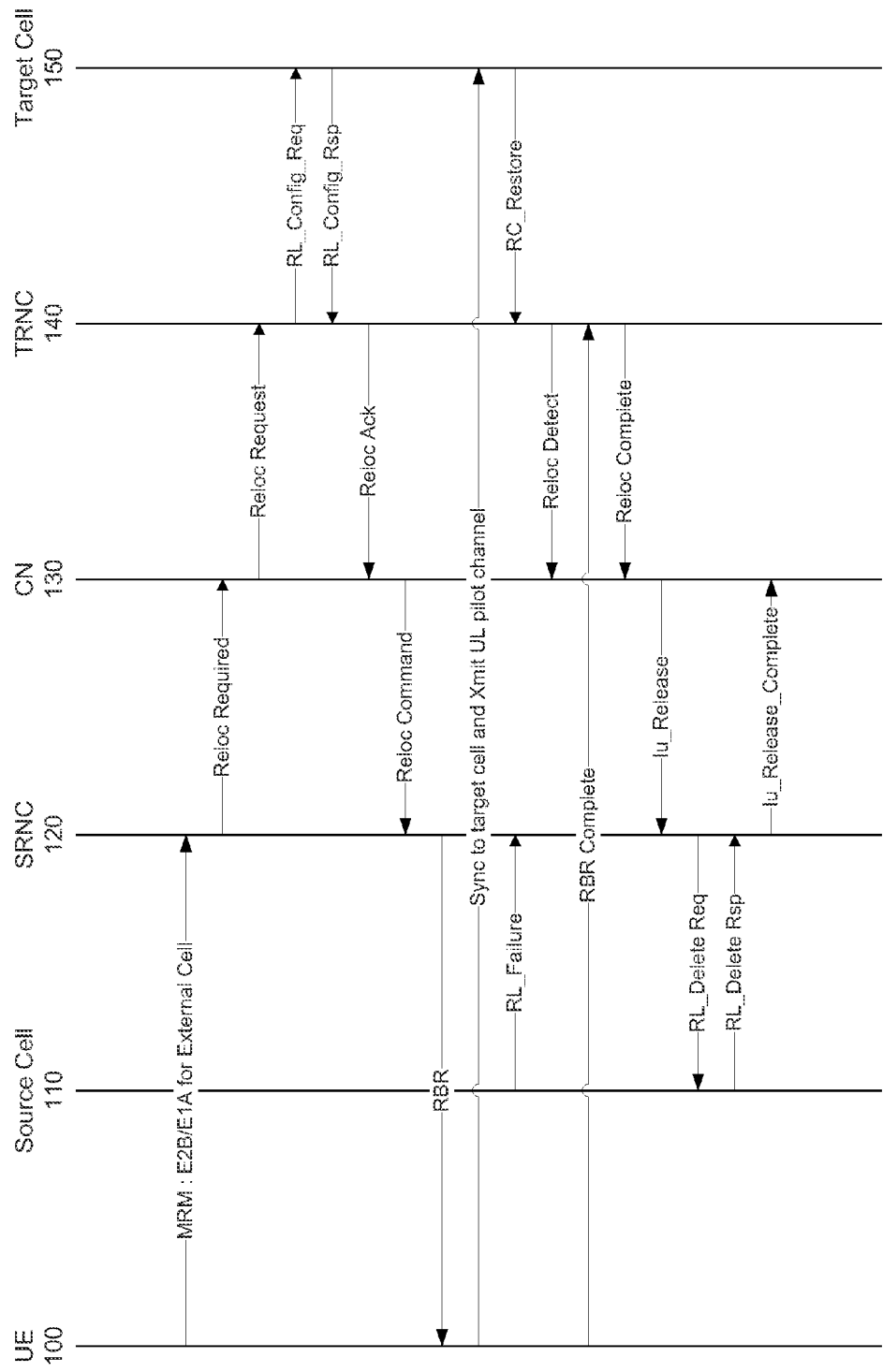
FIG. 1 is an exemplary call flow for SRNS relocation and hard handover.

FIG. 1 illustrates a typical, exemplary call flow for a Serving Radio Network Subsystem (SRNS) Relocation procedure with hard handover in a WCDMA network. In a macrocellular network, such a procedure is attempted in situations when there is no Iur interface between the source and target RNCs. The same concepts can be extended to mobility in various contexts, including but not limited to the following: between a macrocellular network and a local area network such as an Enterprise RAN (ERAN); and between two local RANs/ERANs, between two independently managed macrocellular networks. It should be noted that throughout this specification, the term "ERAN" may be used to refer to any local area network that is deployed in conjunction with a macrocellular network, either on the same frequency, or deployed in a distinct frequency.

As illustrated in FIG. 1, the entire procedure is triggered by a UE measurement report message sent from a UE 100 to a source RNC (SRNC) 120 that informs the SRNC 120 of the presence of a target cell 150, either on the same frequency in the case of a co-channel deployment, or on a separate frequency in the case of an inter-frequency deployment. A relocation required message is sent from the SRNC 120 to the Core Network (CN) 130, whereupon the CN 130 forwards a relocation request message to the target RNC (TRNC) 140. The TRNC 140 and target cell 150 exchange relocation configuration request and response information, and the TRNC 140 sends a relocation acknowledgement message to the CN 130. The CN then transmits a relocation command message to the SRNC 120, where the SRNC 120 then sends a Radio Resource Control (RRC) message Radio Bearer Reconfiguration (RBR) to establish the uplink and downlink shared channels with the UE 100. The UE then syncs to the target cell 150, i.e., switches from the old Radio Link (RL) to the new RL, and the source cell 110 sends an RL failure message to the SRNC 120. The TRNC 140 indicates to the CN 130 that relocation is complete, the Iu interface is released pursuant to an Iu Release message from the CN 130 to the SRNC 120, the RL is deleted in a request and response exchange between the SRNC 120 and the source cell 110. Lastly, the SRNC 120 sends an Iu Release Complete message to the CN 130. The target cell is initially identified from the PSC of the cell that is reported by the UE in the measurement report. Thus the SRNC needs to know how to uniquely disambiguate the target cell from the PSC reported by the UE. In macro networks, this is typically done manually through the process of network planning and provisioning of the neighbor lists on the SRNC.

In UMTS systems, all handovers are network controlled, but may be triggered by UE measurements. That is, UEs typically detect and measure the strength of PSCs of other cells and communicate these PSCs back to the SRNC in the form of a measurement report. Different kinds of measurement events are used depending on whether these measurements are intra-frequency or inter-frequency. It should be noted that additional considerations exist for inter-frequency measurements, including the requirement on the UE to be in Compressed Mode in order to tune its receiver to another frequency.

There is a hierarchy of identifiers that may be used by different entities in any UMTS network. There are three such identifiers relevant to mobility that can be represented as a triplet (PSC, cell identifier (CellID), RNCID). In a UMTS ERAN, there are only 512 PSCs (ranging from 0 to 511) and are typically reused in a network deployment. However, the CellIdentifier and the RNCID have larger number spaces and are typically pair-wise unique within a single operator's deployment.

Typically, in a homogenous network, the RNC is fully aware of the neighbor topology, i.e., the RNC has full knowledge of each cell and the other neighbors (from an RF perspective) of that cell. This neighbor list information, including the triplet (PSC, CellID, RNCID), is actually transmitted by each cell in the system broadcast messages. This neighbor list information is used by the UE to prioritize PSC detection in anticipation of handover. When a neighbor is detected as being sufficiently strong, its PSC is reported by the UE in a measurement report.

In a homogenous network, the entire neighbor topology is managed and fully determined. The RNC is in a position to map the PSC reported by a UE to a full triplet (PSC, CellID, RNCID) since it is aware of the cells in the UE's active set, and the neighboring cells in that location. Therefore, the RNC is able to fully disambiguate the PSC and conclusively identify the target cell for handover. This approach works if the topology can be manually determined and maintained following any changes in the deployment. However, as previously indicated, this approach does not scale well. For example, considering a deployment of a large number of femtocells in the shadow of a macrocellular network, handovers from a macrocell to a femtocell would require disambiguation of a PSC reported by a UE. In principle, this would not be a problem if every femtocell had a unique PSC. However, because of the limited range of PSCs imposed by physical layer processing and UMTS signaling constraints, as well as the logistics of managing PSCs used by femtocells in neighbor lists broadcast by macrocells, it is not feasible to assign a unique, or even a locally unique PSC per femtocell. Even in a "reasonable" femtocell deployment, it is likely that several femtocells within the shadow of a single macrocellular sector are assigned the same PSC.

Alternatively, the disambiguation can be fully performed by the UE as it reads the neighbor lists broadcast by any cell that it connects with, and can map a detected PSC to the triplet (PSC, CellID, RNCID) and report this triplet back. In pre-Release 8 UMTS specifications, though, only the PSC is required to be reported, and most, if not all, UE implementations comply only with this minimum requirement. In the consumer femtocell context, some partial solutions have been proposed/deployed to address the hand-in issue, one such solution using the Closed Subscriber Groups (CSG) attribute associated with a user to attempt a hand-in to that user's registered home femtocell if the appropriate PSC is reported. However, such solutions are not scalable beyond the strict CSG scenario.

Various embodiments, as described herein, seek to address "hand-in" issues associated with local area networks such as, UMTS ERAN, consumer femtocells, etc., by disambiguating a reported PSC and uniquely determining a hand-in target localRAN/cell. The various embodiments utilize a complementary network entity referred to as a local RAN Gateway (GW), which may be, e.g., a modified Iuh or femto gateway. In accordance with various embodiments, the local RAN gateway is positioned within the operator network and serves to aggregate a large number of local RANs.

In certain embodiments, all local RANs deployed for a particular operator on a specific channel are assigned a set of "boundary PSCs." This concept is analogous to sets of "femto PSCs" that are used in commercial femtocell deployments. In the case of consumer femtocell deployments, these boundary PSCs may be the only ones assigned. In the case of more complex local RANs, such as an ERAN, the boundary PSCs may be used in addition to other PSCs.

In some UMTS networks, Neighbor lists of all the macrocells in the macrocellular network are pre-provisioned with these boundary PSCs. Specifically, these PSCs are mapped to cells that are associated with a target RNC that is actually the local RAN GW. The target cell ID is not relevant and can be any value. The pre-provisioning can be done without apriori knowledge of whether a local RAN is presently deployed under the coverage area of the macrocells. This makes it a one-time provisioning exercise on the macro network and providing future compatibility.

It is important for a UE to expeditiously detect cells of a local RAN upon entry into the area covered by this RAN. A local RAN, such as an ERAN, may choose to use boundary PSCs on some cells in order to facilitate this detection. Additionally, boundary PSCs may also be sprinkled through the interior of the ERAN so that a UE in the ERAN coverage area will discover a boundary PSC with high probability. In addition to the boundary PSCs, the ERAN may also utilize other PSCs that are not known to the macrocells in the vicinity of the ERAN deployment. This provisioning step is required for good cell reselection performance of the UE as it enters the coverage area of the ERAN. The selection of the cells for use with the boundary PSCs may be either manual or learned via automated means, such as estimation of user density, mobility, RF topology of the cells, etc.

UEs in an active session (referred to as Cell DCH in UMTS) on the macro cell are configured by the macrocell to measure and report the PSCs used by the neighbor cells, which will typically include the boundary PSCs set aside for use in local RANs. Upon reception of a report from the UE that requires a handover to a "local RAN boundary PSC," a macro RNC will map the target RNCID corresponding to this PSC to the local RAN GW prior to initiating an SRNS Relocation Required message.

Figure 2:
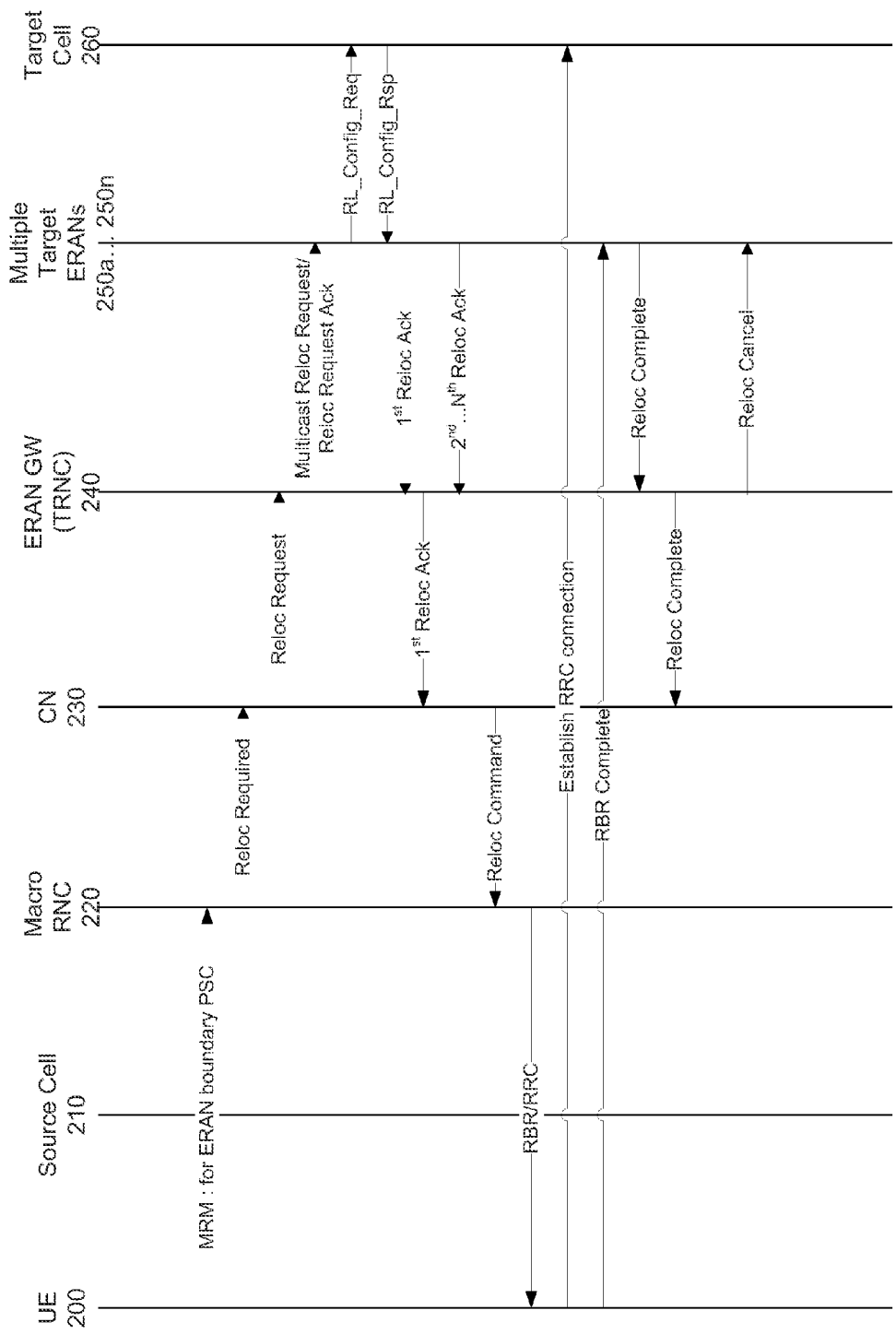
FIG. 2 is an exemplary call flow for hand-in into a UMTS ERAN.

FIG. 2 is an exemplary call flow for hand-in into a local RAN, such as a UMTS ERAN, in accordance with one embodiment of the present invention that utilizes a multicast with predefined radio bearer configurations approach. This embodiment is described from the point at which a macro RNC 220 has received a UE measurement report message from a UE 200 indicating the presence of a cell (e.g., one of multiple target cells 260*a*-*m*) that is identified to be a well-known "ERAN boundary PSC." The macro RNC 220 then sends an SRNS Relocation Required message to the CN 230 (e.g., a mobile switching center (MSC) or Serving GPRS Support Node (SGSN)), which sends a Relocation Request message to the local RAN GW 240, identified as the target RNC for the reported PSC/target cells 260*a*-*m*.

In the nominal call flow analogous to that illustrated in FIG. 1, the local RAN GW 240 would theoretically just forward the Relocation Request message to a specific target ERAN. However, because the "local RAN boundary PSCs" may be reused in each of the deployed ERANs, the local RAN GW is not in a position to disambiguate a specific target local RAN/ERAN. Thus, the local RAN GW 240 multicasts the SRNS Relocation Request to multiple ERANs 250*a*-*n*. Additionally, since the "local RAN boundary PSC" may be reused within each ERAN as well, multiple cells with the same PSC as indicated in the SRNS Relocation Request, may be configured per ERAN.

The number of cells configured in a given local RAN may simply be all the cells with the given PSC, or some subset of it. The selection of the subset of cells to participate in the handin event may be manual or automatically discovered.

It should be noted that during a "cleanup" phase, as will be discussed in greater detail below, any radio links (i.e., cells) that did not receive the UE's uplink signal may be torn down to ensure that an inbound handover is terminated on a single cell.

In a standard implementation, a target RNC would unilaterally and autonomously generate a response, i.e., a Reloc Request Ack. The various parameters chosen for the post-handover configuration (airlink, RLC, ciphering, etc.) signaled in this response are typically chosen autonomously by the target RNC according to internal rules. However, this approach conflicts with the aforementioned multicast procedure. This is because each target ERAN 250*a*-*n* would generate a different response from its peers, thus making it infeasible for the local RAN GW 240 to synthesize a single configuration to be echoed back to the SRNC in the Relocation Command. Thus, a mechanism is provided that coordinates the actions of the local RAN GW 240 with the RNC software in each of the target ERANs 250*a*-*n* so that a harmonized Relocation Command is sent back to the source Macro RNC 220, and a corresponding RRC message onward to the UE 200.

In accordance with one aspect of this embodiment, the local RAN GW 240 unilaterally prepares a Reloc Request Ack and sends it to the target ERANs 250*a*-*n*, along with the original Relocation Request. The parameters contained within such a pre-configured Reloc Request Ack inform each of the target ERANs 250a-n how to allocate resources for a radio bearer that may be established with the prospective UE (e.g., UE 200) that is handing in to one of them. It should be noted that this pre-configured Reloc Request Ack uses resources that are pre-allocated in each of the target ERANs 250a-n.

In accordance with another aspect of this embodiment, and as an alternative to utilizing a pre-configured Reloc Request Ack, Reloc Request Ack messages are synchronized to allow for the aforementioned harmonized Relocation Command to be sent to the Macro RNC 220. Accordingly, and upon receipt of a Relocation Request message from the CN 230, the local RAN GW 240 generates a pair of tokens, i.e., an "airlink" token and an "identifier" token. These tokens achieve the same end goal of pre-configuring the Reloc Request Ack, but with the advantage of keeping the local RAN GW 240 agnostic to the actual lower-layer mechanisms to do so. The complete content of the Reloc Request Ack is a function of both tokens. For example, the airlink and identifier tokens may be concatenated, or alternatively, a hash function may be used to combine the airlink and identifier tokens. Those skilled in the art will understand that other combinations of the airlink and identifier tokens are possible and are contemplated within the scope of the present invention.

The airlink token is tied to a specific configuration of airlink resources. For example, a specific set of downlink and uplink scrambling codes may be pre-reserved and tied to specific values of the airlink token. For each attempted hand-in, the local RAN GW 240 will use a new token from its airlink token pool. The configuration specified by the token is expected to be used only for a transient time interval following hand-in, as will be described in greater detail below.

The identifier token is used to pre-configure parameters such as the UMTS Terrestrial RAN (UTRAN) Radio Network Temporary Identifier (U-RNTI), which will remain in use for the life of the session following hand-in, and will be released only upon a subsequent RRC Connection Release, or a handover out of the local RAN, e.g.,ERAN. Therefore, the pool of these tokens is anticipated to be large, and unlike the airlink resources, the parameters tied to the identifier token are not constrained, and therefore there is no penalty attached to the size of this pool.

Once the pair of tokens is generated, the local RAN GW 240 multicasts the Relocation Request message, along with the pair of tokens, to the set of target ERANs 250a-n. Each target ERAN is able to allocate the appropriate resources based on the airlink token and the identifier token and return a Reloc Request Ack to the local RAN GW 240. Note that the configuration for a prospective inbound UE 200 is going to be identical across all the ERANs that were sent the original Relocation Request message.

Each target local RAN/ERAN 250a-n will issue a Reloc Request Ack message to be sent back to the local RAN GW 240. In accordance with the first aspect of the embodiment relying upon pre-configured Reloc Request Ack messages, this is effectively an echo of the "canned" Reloc Request Ack that was initially sent by the local RAN GW 240 to each target ERAN 250a-n. In the case of the alternative token-based approach described above, each target ERAN 250a-n has configured resources according to the airlink and identifier tokens issued by the local RAN GW 240, and therefore, generate identical Reloc Request Ack messages.

The local RAN GW 240 can simply wait for the first Reloc Request Ack message to arrive, and forward it to the Source/Macro RNC 220 that is part of the macrocell network via the CN 230. The contents of the RBR message, or alternatively, an RRC message such as Physical Channel Reconfiguration (sent from the Source/Macro RNC 220 to the UE 200), that is part of the Reloc Request Ack is, by design, guaranteed to match the resources reserved in each of the target ERANs 250a-n.

The local RAN GW 240 may then simply drop all subsequent responses (e.g., $2^{nd}$-$N^{th}$ Reloc Acks from other target ERANs) after it forwards the first response back to the Source/Macro RNC 220. Alternatively, the local RAN GW 240 may choose to receive and subsume each subsequent message simply to keep track of the state of the communication with each target ERAN. In an alternative implementation, the target ERANs may internally allocate resources in response to a Relocation Request and never actually produce a Reloc Request Ack, deferring to the local RAN GW 240, which produces the Relocation Response message unilaterally and sends it to the Source/Macro RNC 220.

Upon a successful hand-in, the hand-in procedure terminates when the UE 200 manages to establish an RRC connection on one of the cells on one of the target ERANs 250a-n, such as target ERAN 250g (and ultimately, one of target cells 260a-m). At this point, the target ERAN 250g can issue a Relocation Complete message to the local RAN GW 240, which indicates that it has acquired the inbound UE 200, pursuant to receiving an RBR Complete message from the UE 200. The local RAN GW 240 may then issue a Relocation Complete to the CN 230, and then proceed to clean up the resources on the other ERANs that were targeted in the initial multicast Relocation Request. This may be accomplished by sending out Relocation Cancel messages to each of the target ERANs, other than the target ERAN 250g on/to which the hand-in was successful.

Additionally, since it is possible that multiple cells on the ERAN, with the same PSC are participating in the handin of the UE, all cells other than the one that acquires the user would also be autonomously cleaned up by the target ERAN 250g at this stage.

As discussed above, airlink resources are pre-reserved by the local RAN GW on all cells that are participating in the handin through the use of an airlink token. It may be problematic to reserve airlink resources in this manner for the duration of a hand-in session due to the scarcity of airlink resources and the volume of UE's that are likely to be handing into a set of target ERANs in a small time interval. This problem is particularly important when assigning downlink orthogonal variable spreading factor (OVSF) codes, and although partially mitigated by using Secondary Scrambling Codes for the downlink, the reserved resources should be freed up as quickly as possible so that the airlink token associated with these resources can be freed up for reuse across the set of ERANs.

Accordingly, and to the above, the target ERAN may perform a Physical Channel Reconfiguration to move the UE from pre-reserved resources (that are blocked across the set of target ERANs) to "internal airlink resources," which are independently managed by each target ERAN, and in some cases, on each cell. As soon as the Physical Channel Relocation is complete, the target ERAN can send a message to the local RAN GW indicating that the airlink token has been freed up and may be returned to the pool for reuse.

As also noted above, the identifier token is tied to the U-RNTI and may only be cleaned up when the handed-in session terminates. At this point, a message is sent from the target RNC to the local RAN GW indicating that this token may also be returned to the identifier token pool for reuse.

An alternative approach to the use of Physical Channel Reconfiguration would be to use procedures that can change the entire configuration to the UE while retaining the UE on the same cell. An example of such a procedure is the intra-nodeB hard handover procedure defined in the UMTS standards. This approach may be completely localized within the target ERAN and performed after the UE has handed in. It should be noted that the requirement to use the identifier token is eliminated with this alternative approach as the reconfiguration is intended to be performed soon after hand-in, although a potential second outage may occur on the data-plane of the user while this procedure is in progress.

Figure 3:
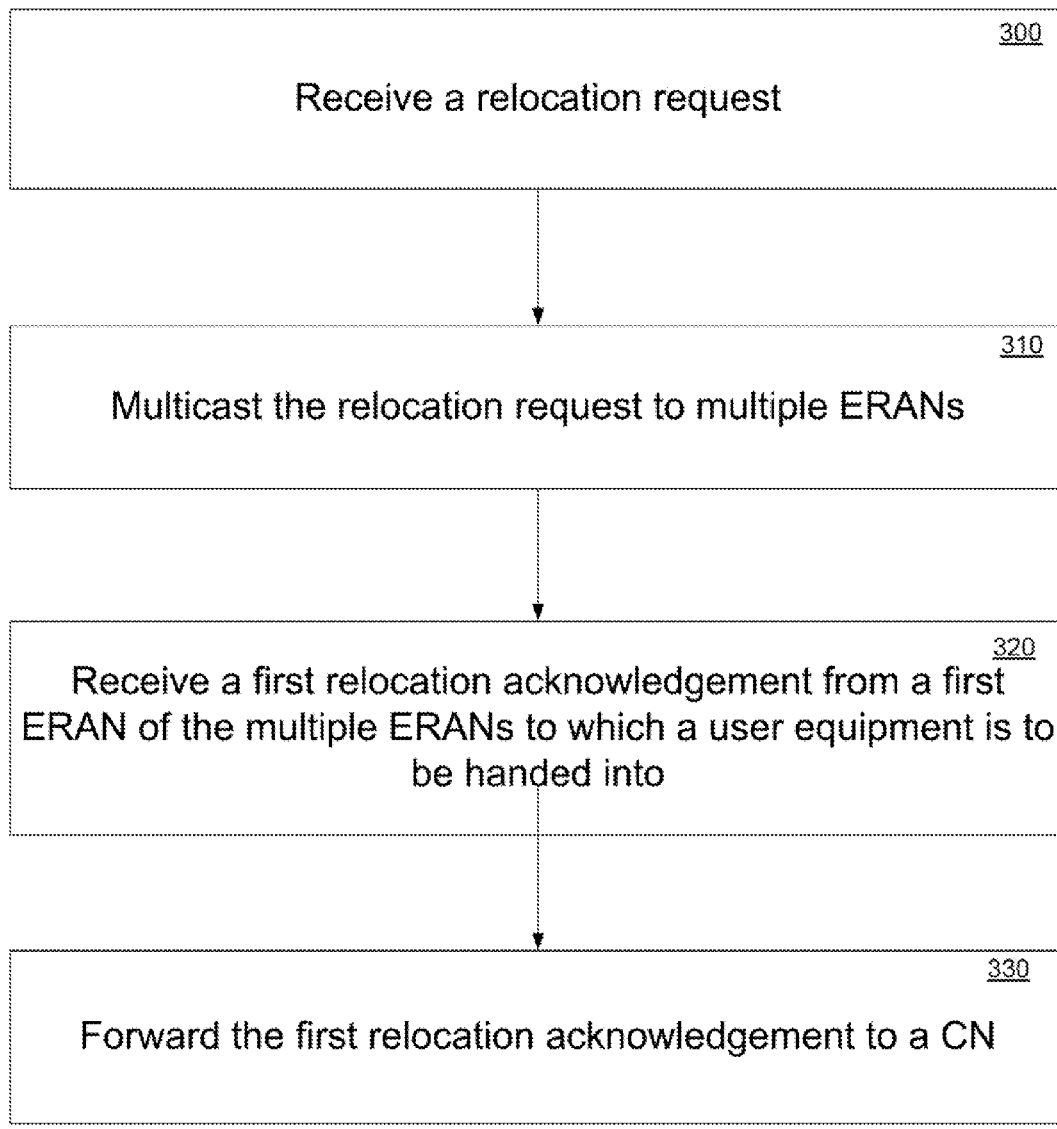
FIG. 3 is a flow chart illustrating a process in accordance with an embodiment of the invention.

FIG. 3 is a flow chart illustrating various processes that may be performed from the perspective of a local RAN GW in accordance with one embodiment of the present invention to achieve disambiguation of a target cell in a local RAN, e.g., UMTS ERAN, deployment. At 300, a relocation request is received. As described above, the relocation request may be received by a local RAN GW from the CN in response to a Source/Macro RNC receiving a measurement report message identifying an ERAN boundary PSC from a UE. At 310, the relocation request is multicast along with a relocation request acknowledgement to multiple target ERANs. At 320, a first relocation acknowledgement may be received from a first ERAN of the multiple target ERANs to which a UE is to be handed into. At 330, the local RAN GW may forward that first relocation acknowledgement to the CN.

In accordance with another embodiment of the present invention, UE detection by a target cell before handover may be leveraged to disambiguate the target cell for handover. That is, this embodiment of the present invention may be used by the combination of the macrocellular and ERAN networks to anticipate the target ERAN/cells that a UE is likely to handover to, and use this information to disambiguate the target cell. In this regard, the target ERANs are made aware of the uplink configuration and timing of an incoming UE when it is still connected to the macrocellular network. For example, this information may be communicated to the target ERANs using a source-RNC-to-target-RNC transparent container ("src-to-target RNC container") that is available in the Relocation Required message. It should be noted that this information is optional in the current 3GPP standards specification, and thus may require a onetime configuration change for conventional macrocellular network elements.

In the case of interfrequency handover, the target cell needs to know the current uplink frequency used by the UE while attached to the macro cellular network. This information is typically not present in the src-to-target RNC container. This can either be signaled as a vendor-specific extension or, alternatively, can be inferred by use of the src cell ID. The src cell IDS is present in the relocation request message, and since a cell may be configured for use with a single frequency on the uplink, the target RNC can use a manual or automatically generated look-up table to determine the frequency. The lookup table may be automatically generated using any of a variety of methods, such as those described in U.S. patent application Ser. No. 12/957,181, titled "METHOD, SYSTEM AND DEVICE FOR CONFIGURING TOPOLOGY OF A WIRELESS NETWORK," filed Nov. 30, 2010, by "sniffing" the broadcast channel of the macrocells apriori.

Figure 4:
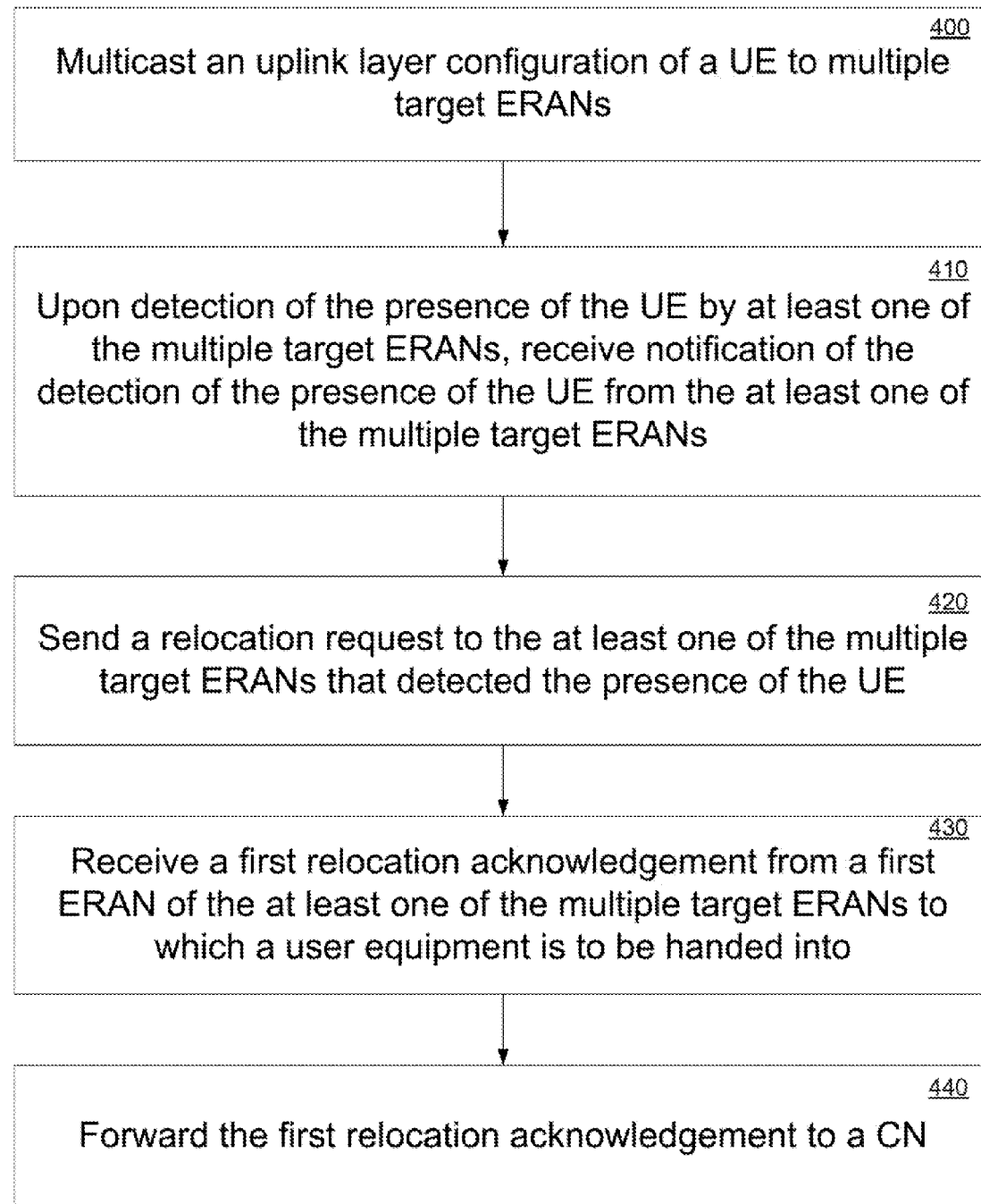
FIG. 4 is a flow chart illustrating a process in accordance with an embodiment of the invention.

FIG. 4 is a flow chart illustrating exemplary processes performed in accordance with this embodiment of the present application. In this approach, and at 400, the local RAN GW multicasts the uplink layer configuration of a UE to multiple target local RANs, such as ERANs. Each ERAN may instruct a subset of the cells that it manages to attempt to detect the UE based on the uplink physical layer configuration. The subset may be restricted to the cells with the same PSC as reported by the UE, some specially marked cells, or all cells that are managed by the ERAN. At 410, if one or more of the multiple target ERANs detect the presence of the UE, the one or more of the multiple target ERANs inform the local RAN GW of this detection, e.g., the local RAN GW receives notification of the detection of the presence of the UE from one or more of the multiple target ERANs. This state information helps to localize the UE and to reduce the scope of the multicast of the Relocation Required message described above in accordance with the one embodiment of the present application. Thus, at 420, a relocation request is sent to only those ERANs that detected the presence of the UE. At 430, a first relocation acknowledgement is received from a first ERAN of the one or more of the multiple target ERANs to which the UE is to be handed into. At 440, as above, the first relocation acknowledgement is forwarded to a CN. If, however, none of the multiple target ERANs detect the presence of the UE, the procedure merely defaults to the "full" multicast approach described above. Alternatively, if none of the multiple target ERANs detect the presence of the UE, the procedure could terminate right away without attempting a hand-in.

From an implementation perspective, it should be noted that a processing chain would be allocated on each target cell to conduct such a search per-UE. For inter-frequency deployments, in which ERANs are deployed in dedicated channels, the radio nodes would use a separate second receiver to monitor the UTRA Absolute Radio Frequency Channel Number (ULARFCN) of the neighboring macrocells in order to perform UE detection.

In accordance with yet another embodiment of the present invention, information from the UE may be utilized to disambiguate a target cell or to limit the range of target ERANs to which Relocation Request messages are multicast in a co-channel or dedicated channel deployment scenarios. For example, a UE-measured SFN-CFN observed timing difference or timing offset may be utilized to disambiguate a target cell to effectuate hand-in.

Per the UMTS specifications, the timing offset is defined as:

$$\text{Timing offset} = \text{chip offset} * 38400 + \text{frame offset},$$

and is measured relative to the connection frame number for the UE transmission of an uplink DPCCH frame and the system frame number of the target cell P-CCPCH frame received in the UE. In case the inter-frequency measurement is done with compressed mode, the UE is not required to read the cell SFN of the target inter-frequency cell and the value for the parameter frame offset is always reported to be 0.

As described above, a source RNC initiates a handover by sending a Relocation Required message. The 3GPP standards specifications allow for the inclusion of an optional information element covering a UE measurement report in a src-to-target RNC container of this message. One of the intended benefits from this inclusion is to allow the target RNC to instruct the target cell to set an appropriate level of initial dedicated traffic channel (DCH) transmit power based on the UE's measurements of the received power.

In a co-channel deployment, the UE will be able to send the timing difference between a cell in its current active set and the target cell being reported in the measurement report in the form of a timing offset for all the cells that the UE measures. This would include the target cell. The local RAN GW, which receives this transparent container, may use the timing information to disambiguate the target ERAN and the target cell. In order to disambiguate based on timing, it is desirable that the reference clocks of all the ERANs and the macrocell network be in sync. However, even if the reference clocks are not in sync, a slow relative drift may be accommodated by the local RAN GW through the use of mechanisms to periodically re-estimate the time difference between cells relative to a master timing reference.

The local RAN GW can be made aware of the timing differences between the cells in each ERAN and the neighboring macrocells to disambiguate the target ERAN/cell. One way to accomplish this is for the ERANs to report timing differences measured during the radio environment monitoring (REM) process back to the local RAN GW. The timing differences reported by the UE have a large range (4096 frames) and fine granularity (chip-level reports), and hence offer the potential to disambiguate the target ERAN and target cell with reasonable certainty, and without requiring an elaborate timing sync mechanism between each individual ERAN and the local RAN GW. Since this measurement is made periodically, if the relative timing drift between these measurements is less than ½ of the temporal separation between 2 cells with the same PSC, the local RAN GW would be able to uniquely disambiguate the target ERAN. If the same PSC is reused on multiple cells on the target ERAN, this process can also be used to disambiguate the target cell.

While the various embodiments are described in the context of hard handovers, use of such concepts in soft-handover contexts is contemplated within the scope of the present invention. For example, in various embodiments, the timing information may be used for target cell discovery even if the source RNC already holds the PSC-to-cell ID mapping. For example, it is possible that the mapping includes multiple cells with the target PSC reported by the UE. In such a case, the timing information may be used to disambiguate a unique target cell from amongst the cells with the identical PSC. Such a scenario is more likely in deployments where there is a high density of PSC reuse within the system. This could include soft-handover within the same RNC or for inter-RNC soft-handover over an Iur link. Thus, the core gateway may not be involved in the handover.

It should be noted that even if "perfect" disambiguation is not always possible, the range of the targets for the multicast Relocation Request messages would still be reduced by utilizing the timing state contained within the local RAN GW.

In another embodiment, measurement reports from UEs may be used to accomplish discovery of relative timing offsets between cells. Each local RAN, such as an ERAN, will typically receive reports from UE's connected to the ERAN on the SFN-SFN timing differences reported against external macrocells as well as neighboring ERANs. These reports can be used by each ERAN to send timing differences relative to cells of another ERAN or the macrocell back to the GW. The GW can aggregate this information to update estimates of relative timing differences between cells belonging to different local RANs.

In another embodiment, the GW may proactively configure a specific timing offset range for each local RAN in order to facilitate PSC disambiguation. Once again, the large range and granularity of timing available facilitates a local RAN GW instructing a specific ERAN to position the system frame number (SFN) offsets of its cell with respect to specific neighboring macrocells in a pre-configured manner. For example, a particular ERAN may be instructed to configure its cells within "N" frames of the SFN boundary of a specific macrocell that at least one of the ERAN cells is able to measure. This pre-configuration of ERAN timing allows further disambiguation of the target ERAN/cell by the local RAN GW in the event of an inbound Relocation Request message.

Since each ERAN would be required to register with the local RAN GW either periodically or upon system reboot/initialization, the local RAN GW may provide an updated configuration each time to maximize timing separation between ERANs and therefore to minimize ambiguity in target ERANs/Cells. This is to accommodate the natural timing drift that occurs between clocks that are unsynchronized between the local RAN GW and the individual ERANs.

In yet another embodiment, the local RAN GW may forward/multicast the timing information to all the ERANs and the ERANs could make an autonomous decision regarding whether to participate in the hand-in and/or the subset of cells in the ERAN that participate in the hand-in. In this case, the local RAN GW need not maintain the timing information for the cells on the ERAN. Thus, the ability to use of timing information may be distributed to the various ERANs.

The above concepts may also be applicable to dedicated channel deployments. In this case, the UE does not report the frame offset, but would still report the chip offset. The chip offsets cover a very narrow span of 10ms, so much "tighter" timing synchronization would be required. However, if recent UE measurement reports are available from UEs within the system, this concept can be used to reduce the number of cells and/or the number of ERANs that participate in the hand-in process. This embodiment may be implemented in dedicated channel deployments, as well as in co-channel deployments.

The restriction of local RANs/ERANs and Cells that participate in the hand-in process can happen either at the local RAN GW, or if the GW supports the multicast framework described above, could also happen at the target ERAN.

In various other embodiments, information from the UE other than timing offset information may be used for disambiguation purposes. The measurement report from the UE includes, for example, the signal-to-noise ratio (SNR), received signal code power (RSCP) and pathloss of the pilot signal broadcast by the various target cells. In various embodiments, the local RAN gateway may use this information to limit the range of target ERANs to which Relocation Request messages are multicast.

Figure 5:
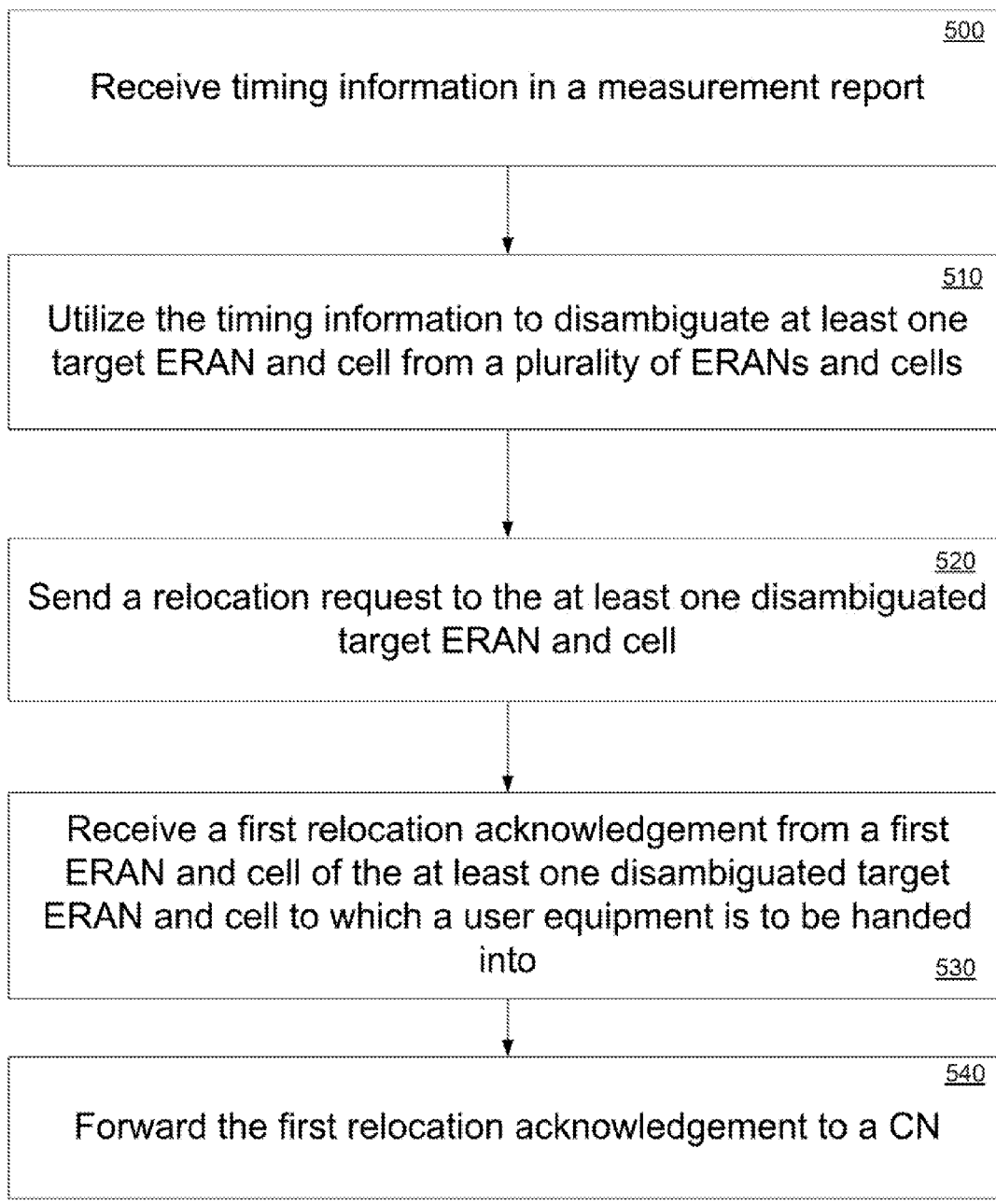
FIG. 5 is a flow chart illustrating a process in accordance with an embodiment of the invention.

FIG. 5 is a flow chart illustrating various processes performed in accordance with an embodiment of the present application. At 500, timing information may be received in a measurement report message from a UE, where the timing information is associated with a local RAN, such as an ERAN, cell that the UE wants to hand-in to. For example, and as discussed above, the measurement report may be received at an local RAN GW from a UE. At 510, the local RAN GW utilizes the timing information received from the UE to disambiguate at least one target ERAN and cell from a plurality of ERANs and cells, where the at least one target ERAN and cell include/encompass the desired ERAN cell to which the UE wants to hand-in. For example, and as also discussed above, the local RAN GW may receive the timing differences between the macrocells and the cells in each ERAN during a REM process, or pre-configured timing offsets. At 520, as in accordance with other embodiments, a relocation request is sent to the at least one disambiguated target ERAN and cell. At 530, a relocation acknowledgement is received from the desired ERAN cell to which a UE is to be handed into. At 540, the relocation acknowledgement is forwarded to the CN.

While various embodiments of the present invention have been described above for a WCDMA UMTS system, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Moreover, various embodiments described herein are described in the general context of method steps or processes, which may be implemented in one embodiment by a computer program product, embodied in a computer-readable memory, including computer-executable instructions, such as program code, executed by computers in networked environments. A computer-readable memory may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes. Various embodiments may comprise a computer-readable medium including computer executable instructions which, when executed by a processor, cause an apparatus to perform the methods and processes described herein.

Furthermore, embodiments of the present invention may be implemented in software, hardware, application logic or a combination of software, hardware and application logic. The software, application logic and/or hardware may reside on a client device, a server or a network component. If desired, part of the software, application logic and/or hardware may reside on a client device, part of the software, application logic and/or hardware may reside on a server, and part of the software, application logic and/or hardware may reside on a network component. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer. In one embodiment, the computer-readable storage medium is a non-transitory storage medium.

What is claimed is:

1. A method, comprising:
receiving a first relocation request message corresponding to a user equipment in a source Radio Access Network (RAN);
in response to receiving the first relocation request message, multicasting a second relocation request message to multiple local RANs, the second relocation request message including parameters enabling the multiple local RANs to allocate resources such that a pre-configured relocation acknowledgement is received from any of the multiple local RANs in response to the second relocation request message;
receiving a first pre-configured relocation acknowledgement from a first local RAN of the multiple local RANs to which a user equipment may be handed into; and
forwarding the first pre-configured relocation acknowledgement toward the source RAN.

2. The method of claim 1, wherein the first relocation request message is received at a local RAN gateway.

3. The method of claim 1, wherein the first relocation request message is received from a core network (CN) that received a relocation required message from a source Radio Network Controller (RNC) in communication with the user equipment and the relocation required message was based on a measurement report received by the source RNC from the user equipment, the measurement report indicating the presence of a local RAN cell identified by a primary scrambling code.

4. The method of claim 1, wherein the parameters included in the second relocation request message comprise the pre-configured relocation acknowledgement informing the multiple local RANS to allocate a pre-configured resource allocation.

5. The method of claim 4, wherein the pre-configured resource allocation indicates allocation of resources on one or more cells on each of the multiple local RANs for a radio bearer for establishing with the user equipment.

6. The method of claim 1, wherein the
parameters included in the second relocation request message comprise first and second tokens enabling the multiple local RANs to allocate a resource allocation that results in the pre-configured relocation acknowledgement.

7. The method of claim 6, wherein, based on the first and second tokens, each of the multiple local RANs allocates resources on one or more cells for a radio bearer for establishing with the user equipment.

8. The method of claim 7, further comprising:
changing a configuration of the user equipment on the first local RAN after establishment of a radio resource control connection with the user equipment in order to free at least one of the first and the second tokens for subsequent reuse across the multiple local RANs.

9. The method of claim 7, further comprising:
freeing at least one of the first and second tokens only after a radio resource control connection on the first local RAN is released by the user equipment.

10. The method of claim 6, wherein the first token is an airlink token and the second token is an identifier token.

11. The method of claim 1, further comprising:
establishing a radio resource control connection with a cell of one or more cells on one of the multiple local RANs; and
issuing, from the one of the multiple local RANs, a relocation complete message to the source RAN via a local RAN gateway at which the relocation request is received.

12. The method of claim 11, further comprising:
upon reception of the relocation complete message at the local RAN gateway, issuing instructions to clean up resources on others of the multiple local RANs upon which the radio resource control connection was not established.

13. The method of claim 1, wherein at least one of the multiple local RANs configures one or more cells of the local RAN to facilitate detection by the user equipment.

14. The method of claim 13, wherein the local RAN uses boundary primary scrambling codes (PSCs) to facilitate detection of the cells.

15. An apparatus, comprising:
a processor; and
a memory including computer program code, the memory and the computer program code configured to, with the processor, cause the apparatus to perform at least the following:
receiving a first relocation request message corresponding to a user equipment in a source Radio Access Network (RAN);
in response to receiving the first relocation request message, multicasting a second relocation request message to multiple local RANs, the second relocation request message including parameters enabling the multiple local RANs to allocate resources such that a pre-configured relocation acknowledgement is received from any of the multiple local RANs in response to the second relocation request message;
receiving a first pre-configured relocation acknowledgement from a first local RAN of the multiple local RANs to which a user equipment may be handed into; and
forwarding the first pre-configured relocation acknowledgement toward the source RAN.

16. The apparatus of claim 15, wherein the apparatus comprises a local RAN gateway.

17. The apparatus of claim 15, wherein the first relocation request message is received from a core network (CN) that received a relocation required message from a source Radio Network Controller (RNC) in communication with the user equipment and the relocation required message was based on a measurement report received by the source RNC from the user equipment, the measurement report indicating the presence of a local RAN cell identified by a primary scrambling code.

18. The apparatus of claim 15, wherein the parameters included in the second relocation request message comprise the pre-configured relocation acknowledgement informing the multiple local RANS to allocate a pre-configured resource allocation.

19. The apparatus of claim 18, wherein the pre-configured resource allocation indicates allocation of resources on one or more cells on each of the multiple local RANs for a radio bearer for establishing with the user equipment.

20. The apparatus of claim 15, wherein
the parameters included in the second relocation request message comprise first and second tokens enabling the multiple local RANs to allocate resources that result in the pre-configured relocation acknowledgement.

21. The apparatus of claim 20, wherein, based on the first and second tokens, each of the multiple local RANs allocates resources on one or more cells for a radio bearer for establishing with the user equipment.

22. A computer program product, embodied on a non-transitory computer-readable medium, comprising:
computer code for receiving a first relocation request message corresponding to a user equipment;
computer code for multicasting a second relocation request to multiple local Radio Access Networks (RANs) in response to receiving the first relocation request message, the second relocation request message including parameters enabling the multiple local RANs to allocate resources such that a pre-configured relocation acknowledgement is received from any of the multiple local RANs in response to the second relocation request message;
computer code for receiving a first pre-configured relocation acknowledgement from a first local RAN of the multiple local RANs to which a user equipment may be handed into; and
computer code for forwarding the first pre-configured relocation acknowledgement to a core network.

* * * * *